(12) United States Patent
Sato

(10) Patent No.: US 10,992,241 B2
(45) Date of Patent: Apr. 27, 2021

(54) CONTROL DEVICE OF MOTOR AND STORAGE MEDIUM

(71) Applicant: Nidec Tosok Corporation, Zama (JP)

(72) Inventor: Kei Sato, Zama (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 0 days.

(21) Appl. No.: 16/632,581

(22) PCT Filed: Aug. 24, 2018

(86) PCT No.: PCT/JP2018/031406
§ 371 (c)(1),
(2) Date: Jan. 21, 2020

(87) PCT Pub. No.: WO2019/044717
PCT Pub. Date: Mar. 7, 2019

(65) Prior Publication Data
US 2020/0244196 A1 Jul. 30, 2020

(30) Foreign Application Priority Data
Aug. 31, 2017 (JP) .............................. JP2017-166566

(51) Int. Cl.
*H02P 1/00* (2006.01)
*H02P 3/00* (2006.01)
(Continued)

(52) U.S. Cl.
CPC .......... *H02P 6/17* (2016.02); *H02M 7/53871* (2013.01)

(58) Field of Classification Search
CPC .............................. H02P 6/17; H02M 7/53871
See application file for complete search history.

(56) References Cited

U.S. PATENT DOCUMENTS

| 6,166,514 A | 12/2000 | Ando et al. |
| 9,007,004 B2 | 4/2015 | Hunter |

(Continued)

FOREIGN PATENT DOCUMENTS

| JP | 2004-064837 A | 2/2004 |
| JP | 2004-350496 A | 12/2004 |

(Continued)

OTHER PUBLICATIONS

Official Communication issued in International Patent Application No. PCT/JP2018/031406, dated Nov. 13, 2018.

*Primary Examiner* — Erick D Glass
(74) *Attorney, Agent, or Firm* — Keating & Bennett

(57) ABSTRACT

A control device of a motor includes difference calculation circuitry that calculates a difference between a current rotation speed and a target rotation speed of the motor, coefficient correction circuitry that outputs corrected proportion coefficient and integration coefficient by multiplying each of an initially set proportion coefficient and integration coefficient by a correction coefficient, output voltage determination circuitry that calculates at least one of a proportional term in which the difference is multiplied by the corrected proportion coefficient and an integral term in which the difference is multiplied by the corrected integration coefficient and the result is integrated and determines one of the proportional term and the integral term or the sum of the two terms as a control value of the output voltage, and signal generation circuitry that generates a control signal on the basis of the control value.

20 Claims, 3 Drawing Sheets

(51) Int. Cl.
*H02P 5/00* (2016.01)
*H02P 6/17* (2016.01)
*H02M 7/5387* (2007.01)

(56) References Cited

U.S. PATENT DOCUMENTS

| 2015/0372632 | A1* | 12/2015 | Kato | B60L 1/00 |
| | | | | 318/722 |
| 2018/0175752 | A1* | 6/2018 | Takeoka | F25B 49/02 |
| 2019/0305711 | A1* | 10/2019 | Kubota | H02P 21/22 |

FOREIGN PATENT DOCUMENTS

| JP | 2015-159626 A | 9/2015 |
| WO | 98/42070 A1 | 9/1998 |

* cited by examiner

CONTROL DEVICE OF MOTOR AND STORAGE MEDIUM

CROSS REFERENCE TO RELATED APPLICATIONS

This is a U.S. national stage of PCT Application No. PCT/JP2018/031406, filed on Aug. 24, 2018, and claiming priority under 35 U.S.C. § 119(a) and 35 U.S.C. § 365(b) to Japanese Application No. 2017-166566, filed Aug. 31, 2017; the entire disclosures of these applications are hereby incorporated herein by reference.

1. FIELD OF THE INVENTION

The present disclosure relates to a control device of a motor and a storage medium.

2. BACKGROUND

A rotation speed of a motor such as a brushless motor is controlled by a control device to obtain a target rotation speed. The rotation speed of the motor is controlled by, for example, changing the phase difference between a rotor position of the motor and a drive current supplied to the motor (for example, see Japanese Unexamined Patent Application Publication No. 2004-350496).

In addition, a rotation speed of the motor can be controlled to obtain the target rotation speed by adjusting an output voltage of a drive current supplied from an inverter to the motor. The output voltage of the inverter is adjusted in, for example, PID control. In PID control, a control value of the output voltage, for example, a duty ratio of a pulse signal for driving the inverter, or the like, is calculated from the difference between the target rotation speed and a current rotation speed using each of proportional (P), integral (I) and derivative (D) coefficients.

In a case where rotation of a motor is controlled through PID control, the responsiveness of the motor is likely to fluctuate due to an input voltage of an inverter. The reason for this is that, although a rotation speed of the motor fluctuates due to an output voltage of the inverter, a speed at which the output voltage changes after control changes depending on an input voltage of the inverter. For example, even if pulse signals have the same duty ratio, one having a lower input voltage has a lower output voltage, and a longer time is then taken until a voltage stabilizes at a target output voltage. For this reason, in an environment in which an input voltage fluctuates, there is variation in a response time of the motor due to control of an output voltage.

SUMMARY

Example embodiments of the present disclosure are able to stabilize the responsiveness of a motor due to rotation control.

An example embodiment of the present application is a control device of a motor to which a drive current is supplied from a power supply by an inverter, the control device including difference calculation circuitry that calculates a difference between a current rotation speed and a target rotation speed of the motor, coefficient correction circuitry that outputs, as coefficients to be used in determining a control value of an output voltage of the inverter, a corrected proportion coefficient and integration coefficient by multiplying each of an initially set proportion coefficient and integration coefficient by a correction coefficient, output voltage determination circuitry that calculates at least one of a proportional term in which the difference calculated by the difference calculation circuitry is multiplied by the corrected proportion coefficient and an integral term in which the difference is multiplied by the corrected integration coefficient and the result is integrated, and determines one of the calculated proportional term and integral term, or the sum of the two terms, as a control value of the output voltage, and signal generation circuitry that generates a control signal to be output to the inverter based on the control value of the output voltage determined by the output voltage determination circuitry, and the correction coefficient is a value of a ratio of a reference voltage to a current input voltage of the inverter, and the reference voltage is an input voltage of the inverter used or assumed to determine the initially set proportion coefficient and integration coefficient.

According to the above-described example embodiment of the present application, the responsiveness of a motor due to rotation control is stabilized.

The above and other elements, features, steps, characteristics and advantages of the present disclosure will become more apparent from the following detailed description of the example embodiments with reference to the attached drawings.

DETAILED DESCRIPTION

Control devices of motors and storage media according to example embodiments of the present disclosure will be described below with reference to the drawings.

Figure 1:
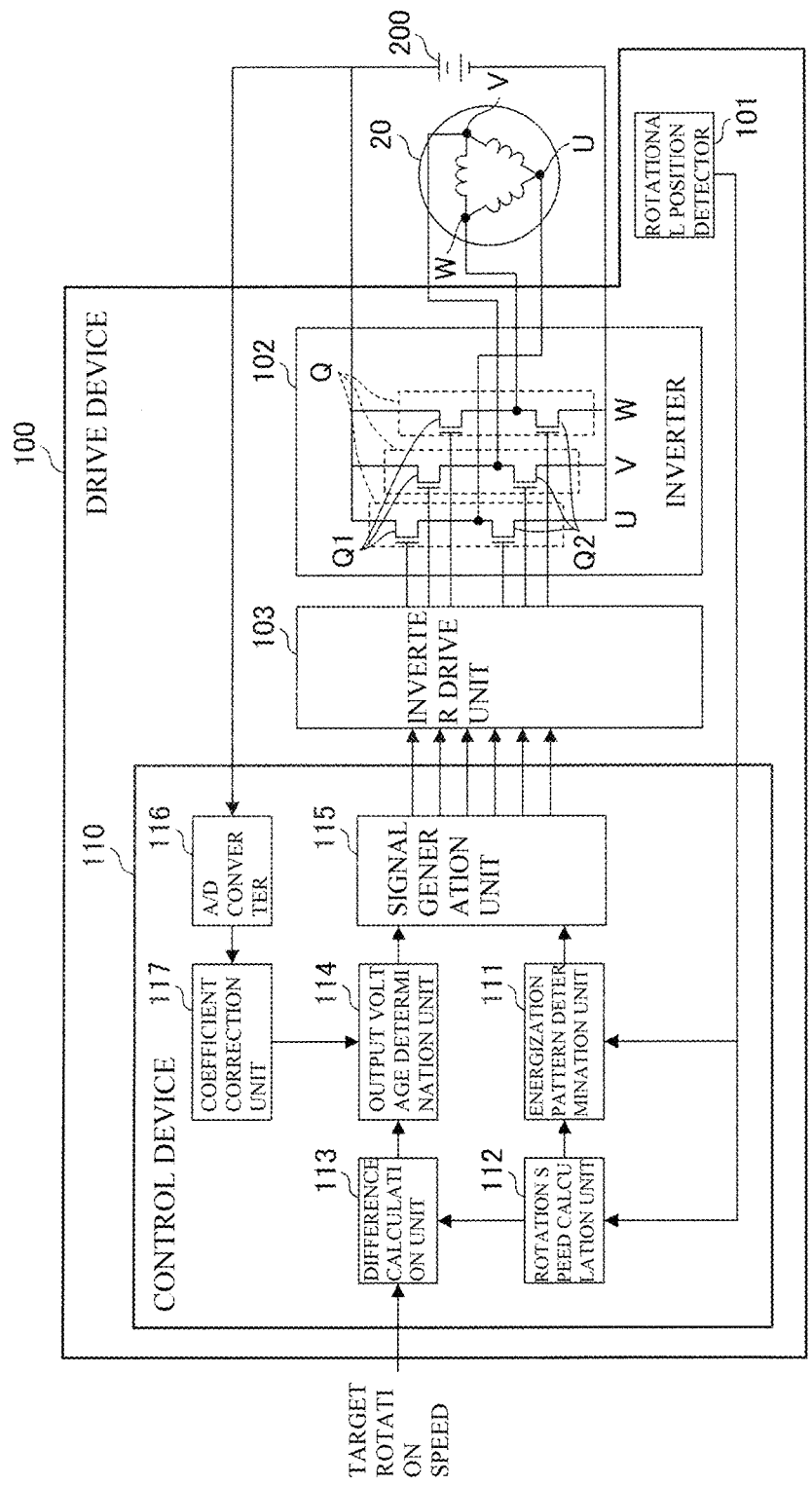
FIG. 1 is a block diagram illustrating a configuration of a control device of a motor according to an example embodiment of the present disclosure.

FIG. 1 illustrates a configuration of a control device 110 of a motor 20 which is an example embodiment of the present disclosure.

As illustrated in FIG. 1, the control device 110 of the motor 20 is used as a part in a configuration of a drive device 100 of the motor 20. The drive device 100 includes, in addition to the control device 110, a rotational position detector 101, an inverter 102, and an inverter drive unit 103.

<Motor>

In the present example embodiment, the motor 20 is a three-phase brushless motor. Although coils of the motor 20 illustrated in FIG. 1 are delta-connected, the coils may be star-connected. The three phases of the motor 20 may be denoted by a U phase, a V phase, and a W phase as illustrated in FIG. 1.

The rotational position detector 101 detects a rotational position of the motor 20. As the rotational position detector 101, for example, a magnetic sensor such as a Hall element or a magneto-resistive element, an optical encoder, a resolver, and the like can be used.

In the present example embodiment, three Hall elements disposed between coils of the motor 20 are used for the rotational position detector 101. Each of the Hall elements detects a magnetic field and outputs a detection signal in proportion to a size of the magnetic field. A rotational position can be detected at, for example, every electrical angle of 60° from a set of three detection signals output from each of the Hall elements. Further, although the example in which detection signals from three Hall elements are grouped in one set has been described, the number of Hall elements grouped in one set is not limited thereto, and the number of Hall elements according to a configuration of the motor 20 can be used.

<Inverter>

The inverter 102 includes three sets of arms Q corresponding to each of the three phases including a U phase, a V phase, and a W phase of the motor 20 as illustrated in FIG. 1. Each arm Q is in a bridge connection. Each arm Q includes a switching element Q1 on an upper side and a switching element Q2 on a lower side that are connected in series. As the switching elements Q1 and Q2, semiconductor elements such as field effect transistors (FETs) or metal-oxide-semiconductor FETs (MOSFETs) can be used, and MOSFETs are used in the present example embodiment.

A power supply 200 is connected to the switching element Q1 on the upper side and the switching element Q2 on the lower side of each arm Q. The inverter 102 receives an input of a control signal generated by the control device 110 and output from the inverter drive unit 103. The inverter 102 switches the switching elements Q1 and Q2 on the upper and lower sides of the arm Q of each phase ON and OFF according to the input control signal and supplies a drive current in an AC voltage waveform to each phase of the motor 20, for example, according to ON and OFF times such as a duty ratio.

<Inverter Drive Unit>

The inverter drive unit 103 generates control signals for the switching element Q1 on the upper side and the switching element Q2 on the lower side of each arm Q of the inverter 102 from a control signal generated by the control device 110, and outputs the control signals.

<Control Device of Motor>

The control device 110 includes an energization pattern determination unit 111, a rotation speed calculation unit 112, difference calculation circuitry 113, output voltage determination circuitry 114, signal generation circuitry 115, an A/D converter 116, and coefficient correction circuitry 117 as illustrated in FIG. 1. The content to be processed by each constituent unit of the control device 110 can be realized through software processing executed by a computer reading a program in which processing procedures of each unit are written from a storage medium storing the program. As the computer, for example, a processor such as a central processing unit (CPU) or a graphics processing unit (GPU), a micro-computer, or the like can be used. As the storage medium, a hard disk, a read only memory (ROM), or the like can be used. Further, the content to be processed by each constituent unit may be realized by hardware such as a field-programmable gate array (FPGA) or a large scale integration (LSI).

The energization pattern determination unit 111 determines an energization pattern of each phase of the motor 20 based on a rotational position indicated by one set of three detection signals output from the rotational position detector 101. For example, energization patterns switch every 60° in a case of energization of 120°, and the current direction varies in each of the energization patterns.

The rotation speed calculation unit 112 obtains an amount of change in the rotational position per unit time from the one set of detection signals output from the rotational position detector 101 and calculates the current rotation speed of the motor 20 from the amount of change.

The difference calculation circuitry 113 calculates the difference between the target rotation speed and the current rotation speed calculated by the rotation speed calculation unit 112. The difference calculation circuitry 113 can receive an input of the target rotation speed indicated each time of calculation from an external control device of the vehicle in which the motor 20 is mounted, or the like, or can read a constant target rotation speed stored in a storage medium to receive an input of the target rotation speed.

The output voltage determination circuitry 114 determines a control value of an output voltage of a drive current to be supplied from the power supply 200 to the motor 20 via the inverter 102 using the difference in rotation speed calculated by the difference calculation circuitry 113. In the present example embodiment, as a control signal output to the inverter 102, the signal generation circuitry 115 outputs a pulse width-modulated (PWM) pulse signal. The output voltage determination circuitry 114 determines a duty ratio of the pulse signal as a control value of the output voltage.

In the present example embodiment, the output voltage determination circuitry 114 determines a duty ratio according to PI control. The output voltage determination circuitry 114 calculates a proportional term in which the difference in rotation speed calculated by the difference calculation circuitry 113 is multiplied by a corrected proportion coefficient output from the coefficient correction circuitry 117. In addition, the output voltage determination circuitry 114 calculates an integral term in which the difference in rotation speed is multiplied by a corrected integration coefficient and the result is integrated. The output voltage determination circuitry 114 determines the sum of the calculated proportional term and integral term as a duty ratio.

The signal generation circuitry 115 generates a pulse signal which is a control signal to be output to each of the switching elements Q1 and Q2 of the inverter 102 on the basis of the energization pattern determined by the energization pattern determination unit 111 and the duty ratio determined by the output voltage determination circuitry 114.

The A/D converter 116 performs A/D conversion on an input voltage of a drive current supplied from the power supply 200 and outputs the result as a digital value.

The coefficient correction circuitry 117 outputs the corrected proportion coefficient and integration coefficient as coefficients used by the output voltage determination circuitry 114 in determination of a duty ratio by multiplying initially set proportion coefficient and integration coefficient by respective correction coefficients.

A correction coefficient is the value of a ratio of a reference voltage to a current input voltage of the inverter 102. A current input voltage of the inverter 102 is an input voltage obtained by the A/D converter 116 performing A/D conversion. The reference voltage is an input voltage of the inverter 102 used or assumed to determine the initially set proportion coefficient and integration coefficient. The initially set proportion coefficient and integration coefficient are coefficients which are adjusted and determined as values satisfying the responsiveness required for the motor 20. In a case where, for example, the motor 20 is used in an electric oil pump, a proportion coefficient and an integration coefficient are determined as values satisfying the requirement that a time in which a discharge pressure and a discharge amount of oil when an input voltage of the inverter 102 is x1 (V) reach target values is within x2 (milliseconds). In this example, the reference voltage is x1 (V). The coefficient correction circuitry 117 retains the initially set proportion coefficient and integration coefficient and the reference voltage in the storage medium, for example, a register, or the like and acquires the coefficients and the reference voltage from the storage medium to calculate the correction coefficient.

<Procedure for Determining Control Value of Output Voltage>

A flow of the control device 110 determining a duty ratio that is a control value of an output voltage will be described below.

First, the difference calculation circuitry 113 calculates the difference between a target rotation speed and a current rotation speed using the following formula (1).

$$d_n = C - A_n \tag{1}$$

$d_n$ represents the difference (rpm) between the target rotation speed and the current rotation speed. C represents the target rotation speed (rpm), and $A_n$ represents the current rotation speed (rpm).

The coefficient correction circuitry 117 determines the value of a ratio of the reference voltage to a current input voltage of the inverter 102 as a correction coefficient. When the current input voltage of the inverter 102 is set to $E_n$ and the reference voltage is set to $E_{ref}$, the correction coefficient is $E_{ref}/E_n$.

The coefficient correction circuitry 117 outputs a corrected proportion coefficient and integration coefficient by multiplying each of an initially set proportion coefficient and integration coefficient by the correction coefficient. When the initially set proportion coefficient is denoted by $K_p$ and the initially set integration coefficient is denoted by $K_i$, the corrected proportion coefficient is $K_p \times E_{ref}/E_n$, and the corrected integration coefficient is $K_i \times E_{ref}/E_n$.

The output voltage determination circuitry 114 calculates a duty ratio using the following formula (2) from the rotation speed difference $d_n$ by using the corrected proportion coefficient and integration coefficient output from the coefficient correction circuitry 117.

$$Wf_n = K_p \times E_{ref}/E_n \times d_n + \Sigma(K_i \times E_{ref}/E_n \times d_n) \tag{2}$$

$Wf_n$ represents a duty ratio (%) calculated using the corrected proportion coefficient and integration coefficient. $K_p$ represents the proportion coefficient (%/rpm), and $K_i$ represents the integration coefficient (%/rpm). $K_p \times E_{ref}/E_n \times d_n$ is a proportional term in which the difference in rotation speed $d_n$ is multiplied by the corrected proportion coefficient. $\Sigma(K_i \times E_{ref}/E_n \times d_n)$ is an integral term in which the rotation speed difference $d_n$ is multiplied by the corrected integration coefficient and the result is integrated.

A duty ratio is a ratio between an input voltage and an output voltage of the inverter 102. Therefore, a rotation speed $A_{n+1}$ (rpm) after the motor 20 is controlled with the duty ratio $Wf_n$ calculated using the above formula (2) is proportional to the value obtained by multiplying the duty ratio $Wf_n$ by the current input voltage $E_n$ of the inverter 102 as shown by the following formula (3).

$$A_{n+1} \propto Wf_n \times E_n \tag{3}$$

In conventional general PI control, an initially set proportion coefficient $K_p$ and integration coefficient $K_i$ are used in calculation of a duty ratio without change. The following formula (4) is a conventional formula for calculating a duty ratio.

$$W_n = K_p \times d_n + \Sigma(K_i \times d_n) \tag{4}$$

$W_n$ represents a duty ratio (%) calculated using an initially set proportion coefficient and integration coefficient.

Since $Wf_n = W_n \times E_{ref}/E_n$ is satisfied according to the above formulas (2) and (4), the above formula (3) can be expressed using the following formula (3a).

$$A_{n+1} \propto Wf_n \times E_n = W_n \times E_{ref} \tag{3a}$$

That is, the rotation speed $A_{n+1}$ after control is performed at the duty ratio $Wf_n$ is proportional to the value obtained by multiplying the duty ratio $W_n$ calculated using the initially set proportion coefficient and integration coefficient by the reference voltage $E_{ref}$.

Meanwhile, a rotation speed $A_n+1$ (rpm) after the motor 20 is controlled at the duty ratio $W_n$ is proportional to the value obtained by multiplying the duty ratio $W_n$ by the current input voltage $E_n$ of the inverter 102 as shown by the following formula (5).

$$A_{n+1} \propto W_n \times E_n \tag{5}$$

A duty ratio is a ratio between an input voltage and an output voltage of the inverter 102. Even at the same duty ratio, when a current input voltage $E_n$ of the inverter 102 is low, an output voltage is low and a change speed of the output voltage is low, and thus a rotation speed changes slightly. On the other hand, when a current input voltage $E_n$ thereof is high, an output voltage is high and a change speed of the output voltage is high, and thus a rotation speed changes significantly. Therefore, when a duty ratio $W_n$ is calculated using the proportion coefficient $K_p$ and the integration coefficient $K_i$ having fixed values in a conventional manner, change in rotation speed of the motor 20 is affected by a current input voltage $E_n$ of the inverter 102 as shown in the above formula (5). A response time of the motor 20 varies because a change speed of an output voltage until the output voltage stabilizes due to control of a duty ratio fluctuates according to an input voltage.

For this problem, in the present example embodiment, a way of correction in which the initially set proportion coefficient $K_p$ and integration coefficient $K_i$ are multiplied by the correction coefficient $E_{ref}/E_n$ is introduced. Accordingly, when the current input voltage $E_n$ of the inverter 102 is low, the proportion coefficient $K_p$ and the integration coefficient $K_i$ are corrected to higher values to adjust a duty ratio to a duty ratio $Wf_n$ for raising the output voltage. In addition, according to the present example embodiment, when the current input voltage is high, the proportion coefficient $K_p$ and the integration coefficient $K_i$ are corrected to lower values to adjust a duty ratio to a duty ratio $Wf_n$ for lowering the output voltage. Therefore, variation in a change speed of the output voltage caused by the input voltage is reduced, and a rotation speed of the motor 20 becomes a rotation speed when PI control is performed by using coefficients initially set at the reference voltage as shown in the above formula (3a). Even if the input voltage $E_n$ has a different voltage value, a response time of the motor 20 can be easily controlled to a constant time, that is, a target response time assumed at the reference voltage, and thus the responsiveness of the motor 20 can stabilizes.

A response time of the motor 20 to the duty ratio $Wf_n$ calculated using the corrected proportion coefficient $K_p$ and integration coefficient $K_i$ may be a constant time or close to a constant time before and after change of the input voltage of the inverter 102.

Note that, "before and after change of the input voltage" is of change in an environment in which the motor 20 is used, rather than change in time. That is, even if the current input voltage $E_n$ has a different voltage value, a response time is substantially a constant time, and thus the responsiveness of the motor 20 stabilizes.

According to certain results, a 10% to 90% response time was 279 ms when the test motor was controlled with the duty ratio $Wf_n$ under the conditions in which the voltage input to the inverter was 10 V. A 10% to 90% response time was 287 ms when the test motor was controlled with the duty ratio $Wf_n$ by changing the input voltage to the inverter to 16 V. The error was as small as 8 ms, and the response time was close to a constant time.

Meanwhile, the error of the 10% to 90% response time was 150 ms when the same test motor was driven at a duty ratio $W_n$ under the conditions in which the input voltages were 10 V and 16 V. It was ascertained that the error was large in comparison to the case of the response time at the duty ratio $Wf_n$ and the response time varied depending on the input voltages.

Figure 2A:
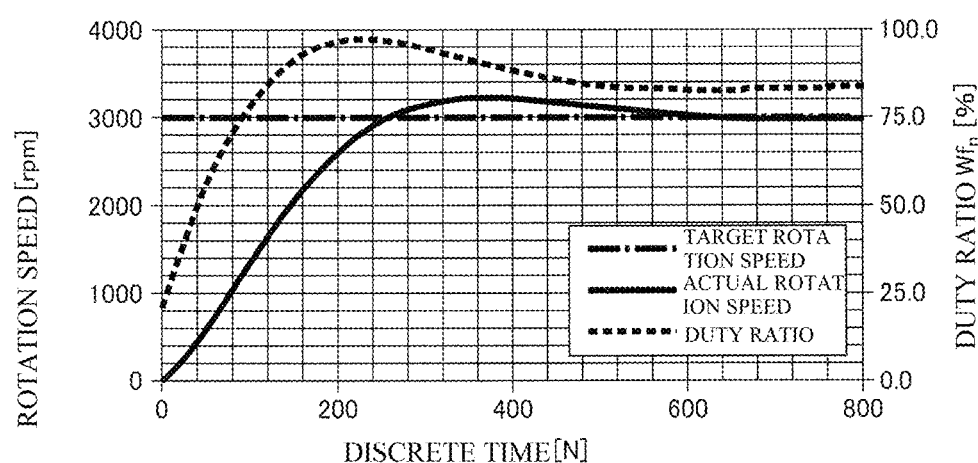
FIG. 2A is a graph showing a duty ratio calculated using corrected coefficients and a rotation speed of a motor driven at the duty ratio under a condition in which an input voltage to an inverter is 10 V.
Figure 2B:
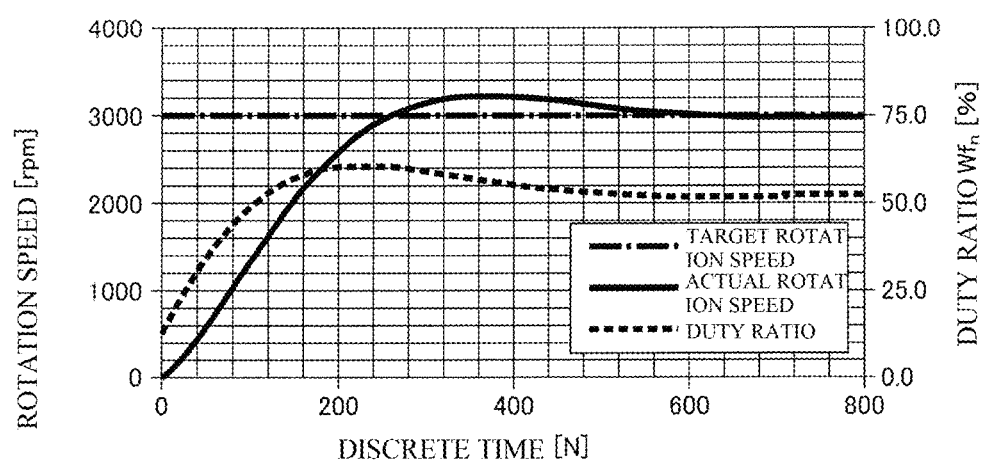
FIG. 2B is a graph showing a duty ratio calculated using corrected coefficients and a rotation speed of the motor driven at the duty ratio under a condition in which an input voltage to the inverter is 16 V.

FIG. 2A and FIG. 2B are graphs showing the duty ratio $Wf_n$ calculated using the corrected proportion coefficient and integration coefficient and the actual rotation speed of the test motor driven at the duty ratio $Wf_n$. FIG. 2A is a graph when an input voltage to the inverter for driving the test motor was set to 10 V. FIG. 2B is a graph when an input voltage to the inverter for driving the test motor was set to 16 V. In FIG. 2A and FIG. 2B, the discrete time (N) of the horizontal axis represents times at which control was performed at intervals by N (N=0 to n) which is the number of control operations.

As shown in FIG. 2A and FIG. 2B, the change speed of the duty ratio $Wf_n$ calculated using the corrected proportion coefficient and integration coefficient changes depending on the current input voltage of the inverter. The change speed of the duty ratio $Wf_n$ becomes higher as the current input voltage becomes lower, and the change speed becomes lower as the current input voltage becomes higher. For example, if the rates of change of the duty ratio $Wf_n$ when the discrete times in FIG. 2A and FIG. 2B satisfy N=40 are compared, the change speed thereof at the input voltage of 10 V is higher than that at the input voltage of 16 V. That is, the duty ratio $Wf_n$ quickly changes at a low input voltage and slowly changes at a high input voltage, and thus a response time of the motor can be set to a constant time or close to a constant time.

In addition, the slope of the amount of change in the duty ratio $Wf_n$ calculated using the corrected proportion coefficient and integration coefficient becomes higher as the current input voltage of the inverter becomes lower and becomes lower as the current input voltage becomes higher. For example, although the slope of the curve of the duty ratio $Wf_n$ in FIG. 2A and FIG. 2B is the slope of the amount of change in the duty ratio $Wf_n$, comparing the slopes of the curves at the discrete time of N=40, the slope at the input voltage of 10 V is higher than that at the input voltage of 16 V. The duty ratio $Wf_n$ having the slope of the amount of change quickly changes when the input voltage is low and slowly changes when the input voltage is high, and thus a response time of the motor can be set to a constant time or close to a constant time.

Likewise, the first duty ratio $Wf_n$ calculated using the corrected proportion coefficient and integration coefficient becomes higher as the current input voltage of the inverter becomes lower and becomes lower as the current input voltage becomes higher. The first duty ratio $Wf_n$ is a duty ratio calculated at N=0 which is the number of control operations when control starts.

At the time of start of control, the current rotation speed $A_0$=0 rpm, and a target rotation speed C that is higher than 0 rpm is given, and thus a rotation speed difference $d_0$ satisfies the relation $d_0=C-A_0=C$. Since the first duty ratio $Wf_0$ satisfies $Wf_0=K_p \times E_{ref}/E_0 \times C + K_i \times E_{ref}/E_0 \times C$, the first duty ratio $Wf_0$ becomes higher as the current input voltage $E_0$ becomes lower. Therefore, the first duty ratio $Wf_0$ at the discrete time N=0 is higher when the input voltage is as low as 10 V than when the input voltage is 16 V as illustrated in FIG. 2A and FIG. 2B.

Figure 3A:
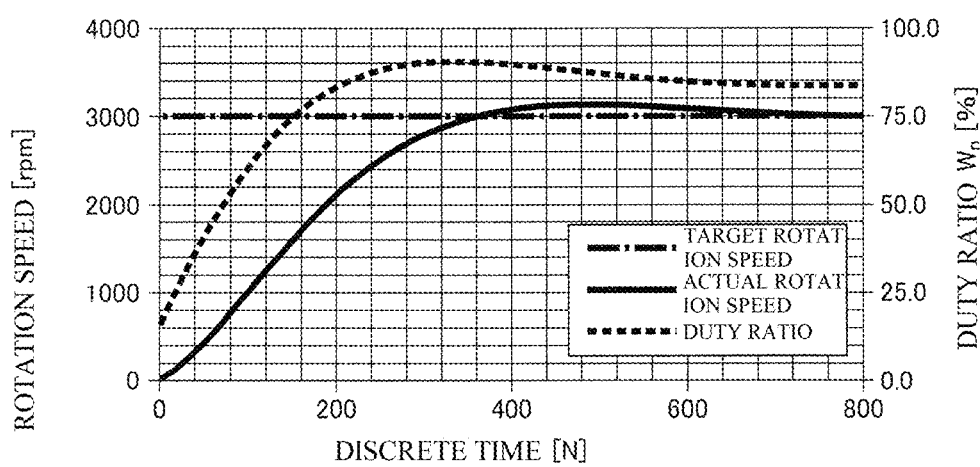
FIG. 3A is a graph showing a duty ratio calculated using initially set coefficients and a rotation speed of the motor driven at the duty ratio under a condition that an input voltage to the inverter is 10 V.
Figure 3B:
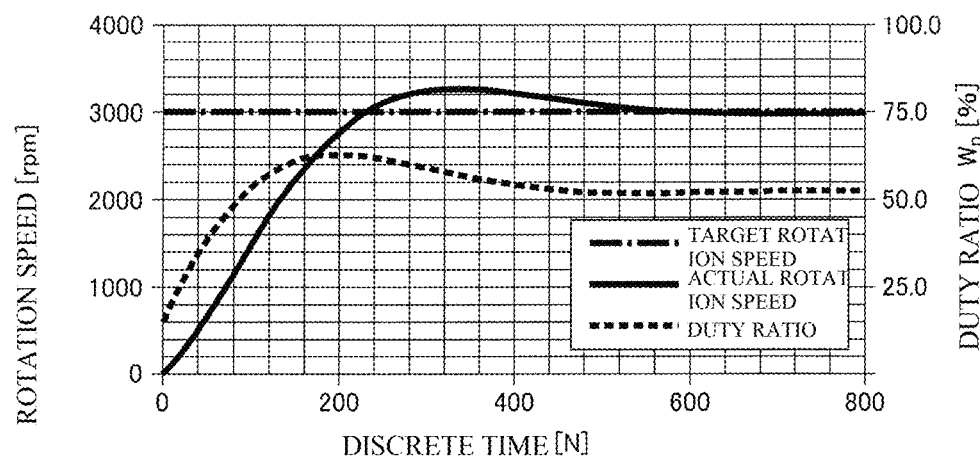
FIG. 3B is a graph showing a duty ratio calculated using initially set coefficients and a rotation speed of the motor driven at the duty ratio under a condition that an input voltage to the inverter is 16 V.

FIG. 3A and FIG. 3B are graphs showing the duty ratio $W_n$ calculated using the initially set proportion coefficient and integration coefficient and an actual rotation speed of the test motor driven at the duty ratio $W_n$. FIG. 3A is a graph when an input voltage to the inverter for driving the test motor is set to 10 V. FIG. 3B is a graph when an input voltage to the inverter for driving the test motor is set to 16 V. In FIG. 3A and FIG. 3B, the discrete time (N) on the horizontal axis indicates time in which control is performed at intervals by the number of control operations N (N=0 to n).

As shown in FIG. 3A and FIG. 3B, also in the case of the duty ratio $W_n$, when the input voltage is low, the change speed is high and the slope of the amount of change is high. However, a change speed at the duty ratio $W_n$ is a phenomenon caused by a large rotation speed difference $d_n$ since the rotation speed becomes lower as the input voltage becomes lower at a certain time. The response time varies even if the speed change caused by the phenomenon is considered.

In addition, in the case of the duty ratio $W_n$, the first duty $W_0$ is constant regardless of the input voltage. Because the first duty $W_0$ at the time of a start of control satisfies the relation $W_0=K_p \times C + K_i \times C$.

As described above, according to the control device 110 of the present example embodiment, it is possible to set the response time of the motor 20 due to control of an output voltage of the inverter 102 close to a constant time, regardless of a current input voltage of the inverter 102. Therefore, the responsiveness of the motor 20 due to rotation control can stabilize even in a case where the motor 20 is used in an environment in which an input voltage to the inverter 102 varies or an environment in which the input voltage is different from an assumed reference voltage.

Particularly, in a case where the power supply 200 is a power supply with a variable voltage of a drive current supplied to the motor 20 and an input voltage to the inverter 102 varies, the stable responsiveness can be achieved regardless of the input voltage, and thus this configuration is effective.

Since batteries have input voltages easily varying depending on an amount of charge, in a case where the power supply 200 is a battery, the stable responsiveness can be achieved, and thus this configuration is likewise effective.

In addition, the initially set proportion coefficient $K_p$ and integration coefficient $K_i$ need to be adjusted to appropriate values when a target response time is obtained even when an input voltage varies by changing the input voltage to the inverter 102. However, according to the present example embodiment in which the proportion coefficient $K_p$ and the integration coefficient $K_i$ are corrected, since the coefficients can be determined to be values at which the target response time is obtained at the reference voltage $E_{ref}$, the work of setting the proportion coefficient $K_p$ and the integration coefficient $K_i$ becomes easy.

Modified Example 1

In the above-described example embodiment, the output voltage determination circuitry 114 can also determine a duty ratio from a change amount between a difference calculated at a current time and a difference calculated at the previous time, instead of a difference between the current rotation speed and the target rotation speed. Since a response time of the motor 20 is affected by the magnitude of acceleration of a rotation speed, rotation of the motor 20 can be controlled with high accuracy by controlling the output voltage according to the change amount of the difference.

In a modified example 1, the difference calculation circuitry 113 calculates a change amount of the difference calculated at the current time and the difference calculated at the previous time using the following formula (1a).

$$d_{in} = d_n - d_{n-1} \tag{1a}$$

$d_{in}$ represents the change amount of the difference. $d_n$ represents the difference calculated at the current time. $d_{n-1}$ represents the difference calculated at the previous time.

$d_{in}$ can also be expressed by the following formula (1b).

$$d_{in} = A_{n-1} - A_n \tag{1b}$$

$A_n$ represents the rotation speed calculated at the current time. $A_{n-1}$ represents the rotation speed calculated at the previous time.

In the modified example 1, the output voltage determination circuitry 114 calculates a duty ratio $Wf_{in}$ using the change amount of the difference $d_{in}$ in the following formula (2a).

$$Wf_{in} = K_p \times E_{ref}/E_n \times d_{in} + K_i \times E_{ref}/E_n \times d_n \tag{2a}$$

$Wf_{in}$ represents the duty ratio calculated using the corrected proportion coefficient and integration coefficient.

The above-described duty ratio $Wf_{in}$ can also be expressed by the following formula.

$$Wf_{in} = W_{in} \times E_{ref}/E_n$$

$W_{in}$ is the duty ratio calculated using the initially set proportion coefficient and integration coefficient in the following formula (4a).

$$Wi_n = K_p \times d_{in} + K_i \times d_n \tag{4a}$$

A rotation speed $Af_{in+1}$ (rpm) after control at the duty ratio $Wf_{in}$ is proportional to an input voltage $E_n$ to the inverter 102 as expressed by the following formula (3b). Since $Wf_{in} \times E_n$ is equal to $W_{in} \times E_{ref}$, the rotation speed $Af_{in+1}$ (rpm) is also proportional to the multiplication value of the duty ratio $W_{in}$ and the reference voltage $E_{ref}$.

$$Af_{in+1} \propto Wf_{in} \times E_n = W_{in} \times E_{ref} \tag{3b}$$

Modified Example 2

In the above-described example embodiment, the output voltage determination circuitry 114 calculates at least two among the proportional term, the integral term and a derivative term by further calculating the derivative term, and can determine the sum of two or more terms as a duty ratio. In addition, the output voltage determination circuitry 114 can also determine one among the proportional term, the integral term and the derivative term as a duty ratio.

For PID control, for example, the coefficient correction circuitry 117 further multiplies an initially set derivative coefficient by the above-described correction coefficient, and outputs a corrected derivative coefficient as a coefficient used in determining a control value of an output voltage of the inverter 102. The output voltage determination circuitry 114 calculates the derivative term in which the derivative value of the difference calculated by the difference calculation circuitry 113 is multiplied by the corrected derivative coefficient, in addition to the above-described proportional term and the integral term. The output voltage determination circuitry 114 determines the sum of the calculated proportional term, the integral term and the derivative term as a control value of the output voltage, that is, a duty ratio.

The following formula is a calculation formula of a duty ratio for PID control.

$$Wf_n = K_p \times E_{ref}/E_n \times d_n + \Sigma(K_i \times E_{ref}/E_n \times d_n) + K_d \times E_{ref}/E_n \times d/dt(d_r) \tag{2d}$$

d/dt ($d_n$) represents the derivative value of the difference, and $K_d \times E_{ref}/E_n \times d/dt$ ($d_n$) is an integral term.

Among the proportional term, the integral term and the derivative term, the output voltage determination circuitry 114 determines the sum of the proportional term and the derivative term as a duty ratio in case of PD control, and determines the sum of the integral term and the derivative term as a duty ratio in case of ID control.

Among the proportional term, the integral term and the derivative term, the output voltage determination circuitry 114 determines the proportional term in case of P control, the integral term in case of I control, and the derivative term in case of D control, as a duty ratio respectively.

Note that, in the modified example 1, when the derivative term is calculated and the sum of at least two or more terms among the proportional term, the integral term and the derivative term is determined as a duty ratio, the derivative term may be calculated by multiplying the change amount of the difference $d_{in}$ by the corrected derivative coefficient.

The present disclosure is not limited to the above-described example embodiment and modified example.

For example, a motor is not limited to the above-described three-phase brushless motor as long as it is a motor whose rotation speed can be controlled through PID control.

In addition, the signal generation circuitry 115 may generate a pulse amplitude-modulated (PAM) pulse signal, and the output voltage determination circuitry 114 may determine the amplitude of the pulse signal as a control value of an output voltage. The present disclosure can also be applied to the case where the amplitude of the PAM pulse signal is determined by PID control.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A control device of a motor to which a drive current is supplied from a power supply by an inverter, the control device comprising:
    difference calculation circuitry to calculate a difference between a current rotation speed and a target rotation speed of the motor;
    coefficient correction circuitry to output a corrected proportion coefficient and an integration coefficient as coefficients to be used in determining a control value of an output voltage of the inverter by multiplying each of an initially set proportion coefficient and integration coefficient by a correction coefficient;

output voltage determination circuitry to calculate at least one of a proportional term in which a difference calculated by the difference calculation circuitry is multiplied by the corrected proportion coefficient and an integral term in which the difference is multiplied by the corrected integration coefficient and the result is integrated, and to determine one of the calculated proportional term and integral term or the sum of the two terms as a control value of the output voltage; and signal generation circuitry to generate a control signal to be output to the inverter based on the control value of the output voltage determined by the output voltage determination circuitry; wherein the correction coefficient is a value of a ratio of a reference voltage to a current input voltage of the inverter, and the reference voltage is an input voltage of the inverter used or assumed to determine the initially set proportion coefficient and integration coefficient.

2. The control device of a motor according to claim 1, wherein a response time of the motor due to the control value is a constant time or close to a constant time before and after change of an input voltage of the inverter.

3. The control device of a motor according to claim 2, wherein the control signal is a PWM pulse signal;

the output voltage determination circuitry determines a duty ratio of the pulse signal as a control value of the output voltage; and a change speed of the duty ratio of the pulse signal determined by the output voltage determination circuitry changes depending on the current input voltage of the inverter.

4. The control device of a motor according to claim 3, wherein the change speed of the duty ratio becomes higher as the current input voltage of the inverter becomes lower, and becomes lower as the current input voltage of the inverter becomes higher.

5. The control device of a motor according to claim 2, wherein the control signal is a PWM pulse signal;

the output voltage determination circuitry determines a duty ratio of the pulse signal as a control value of the output voltage; and a slope of an amount of change in the duty ratio of the pulse signal determined by the output voltage determination circuitry becomes higher as the current input voltage of the inverter becomes lower, and becomes lower as the current input voltage of the inverter becomes higher.

6. The control device of a motor according to claim 1, wherein the coefficient correction circuitry further outputs a corrected derivative coefficient as a coefficient used in determining a control value of an output voltage of the inverter by multiplying an initially set derivative coefficient by the correction coefficient; and the output voltage determination circuitry calculates at least two terms of the proportional term, the integral term and a derivative term in which a derivative value of the difference is multiplied by the corrected derivative coefficient, and determines the sum of the calculated two terms or more as a control value of the output voltage.

7. The control device of a motor according to claim 6, wherein the difference calculation circuitry calculates a change amount between a difference calculated at a current time and a difference calculated at the previous time; and the output voltage determination circuitry calculates the proportional term by multiplying the change amount of the difference by the corrected proportion coefficient, calculates the integral term by multiplying the difference by the corrected integration coefficient and integrating the result, and calculates the derivative term by multiplying the change amount of the difference by the corrected derivative coefficient.

8. The control device of a motor according to claim 1, wherein the power supply is a power supply with a variable voltage of a drive current supplied to the inverter.

9. The control device of a motor according to claim 1, wherein the power supply is a battery.

10. A computer-readable storage medium storing a program for causing a computer to execute a control method for a motor, the control method for the motor comprising steps of:

calculating a difference between a current rotation speed and a target rotation speed of the motor;

outputting a corrected proportion coefficient and integration coefficient as coefficients to be used in determining a control value of an output voltage of the inverter by multiplying each of an initially set proportion coefficient and integration coefficient by a correction coefficient; and calculating at least one of a proportional term in which the calculated difference is multiplied by the corrected proportion coefficient and an integral term in which the difference is multiplied by the corrected integration coefficient and the result is integrated, and determining one of the calculated proportional term and integral term or the sum of the two terms as a control value of the output voltage; wherein the correction coefficient is a value of a ratio of a reference voltage to a current input voltage of the inverter, and the reference voltage is an input voltage of the inverter used or assumed to determine the initially set proportion coefficient and integration coefficient.

11. The control device of a motor according to claim 2, wherein the coefficient correction circuitry further outputs a corrected derivative coefficient as a coefficient used in determining a control value of an output voltage of the inverter by multiplying an initially set derivative coefficient by the correction coefficient; and the output voltage determination circuitry calculates at least two terms of the proportional term, the integral term and a derivative term in which a derivative value of the difference is multiplied by the corrected derivative coefficient, and determines the sum of the calculated two terms or more as a control value of the output voltage.

12. The control device of a motor according to claim 3, wherein the coefficient correction circuitry further outputs a corrected derivative coefficient as a coefficient used in determining a control value of an output voltage of the inverter by multiplying an initially set derivative coefficient by the correction coefficient; and the output voltage determination circuitry calculates at least two terms of the proportional term, the integral term and a derivative term in which a derivative value of the difference is multiplied by the corrected derivative coefficient, and determines the sum of the calculated two terms or more as a control value of the output voltage.

13. The control device of a motor according to claim 4, wherein the coefficient correction circuitry further outputs a corrected derivative coefficient as a coefficient used in determining a control value of an output voltage of the inverter by multiplying an initially set derivative coefficient by the correction coefficient; and the output voltage determination circuitry calculates at least two terms of the proportional term, the integral term and a derivative term in which a derivative value of the difference is multiplied by the corrected derivative coefficient, and determines the sum of the calculated two terms or more as a control value of the output voltage.

14. The control device of a motor according to claim 5, wherein the coefficient correction circuitry further outputs a corrected derivative coefficient as a coefficient used in determining a control value of an output voltage of the inverter by multiplying an initially set derivative coefficient by the correction coefficient; and the output voltage determination circuitry calculates at least two terms of the proportional term, the integral term and a derivative term in which a derivative value of the difference is multiplied by the corrected derivative coefficient, and determines the sum of the calculated two terms or more as a control value of the output voltage.

15. The control device of a motor according to claim 2, wherein the power supply is a power supply with a variable voltage of a drive current supplied to the inverter.

16. The control device of a motor according to claim 3, wherein the power supply is a power supply with a variable voltage of a drive current supplied to the inverter.

17. The control device of a motor according to claim 4, wherein the power supply is a power supply with a variable voltage of a drive current supplied to the inverter.

18. The control device of a motor according to claim 2, wherein the power supply is a battery.

19. The control device of a motor according to claim 3, wherein the power supply is a battery.

20. The control device of a motor according to claim 4, wherein the power supply is a battery.

* * * * *